United States Patent [19]

Ayers

[11] 4,331,721
[45] May 25, 1982

[54] DECORATIVE HOLDER

[76] Inventor: Anne L. Ayers, P.O. Box 233, Daniels, W. Va. 25832

[21] Appl. No.: 121,161

[22] Filed: Feb. 13, 1980

[51] Int. Cl.³ .............................................. A01G 5/04
[52] U.S. Cl. ....................................... 428/23; 156/61; 248/175; 248/520; 428/24; 428/32
[58] Field of Search ................. D19/81, 84; 211/69.1; 248/519, 175, 346, 346.1, 519-520, 538; 428/23-32, 24; 47/41; 156/61

[56] References Cited

U.S. PATENT DOCUMENTS

| D. 22,416 | 5/1893 | Thomas | D19/81 X |
|---|---|---|---|
| 101,813 | 4/1870 | Bigelow | 248/346 X |
| D. 106,536 | 10/1937 | Heim | D19/84 |
| 124,798 | 3/1872 | Dudley | 248/346 |
| 220,049 | 9/1879 | Atwood | 248/346 |
| 492,143 | 2/1893 | Corley | 248/346 |
| 691,598 | 1/1902 | Christopherson | 428/187 X |
| 900,322 | 10/1908 | Sone | 248/175 |
| 1,043,622 | 11/1912 | Miles | 47/39 X |
| 2,771,695 | 11/1956 | James | 428/23 |
| 4,016,982 | 4/1977 | Schreiber | 211/69.1 |

Primary Examiner—Henry F. Epstein
Attorney, Agent, or Firm—Channing L. Pace

[57] ABSTRACT

A decorative holder for an implement such as a pen, pencil, or thermometer comprising an interwoven base portion including a series of substantially concentric tiers of loops and supporting means for supporting the implement. The holder is made by a method which substantially conceals the intersections of the strand of pliant material from which the base portion is formed to provide a holder having a neat and decorative appearance.

9 Claims, 4 Drawing Figures

DECORATIVE HOLDER

BACKGROUND OF THE INVENTION

This invention relates to a decorative holder including supporting means for supporting an implement or decorative article, and a method for making the holder.

While articles fashioned by interweaving a strand of material are well-known in the art, many such articles are complicated in execution and frequently do not present a neat appearance, particularly at the intersections of the interwoven material.

It is accordingly an object of the invention to provide a useful, decorative, interwoven holder for an implement such as a thermometer, pen, pencil, or a decorative article.

It is an additional object of the invention to provide a method for interweaving a decorative holder which is simple and provides an attractive result.

It is a further object of this invention to provide a decorative holder which is ingeniously interwoven to conceal the steps of construction and which is simple to make.

SUMMARY OF THE INVENTION

The decorative holder of the invention includes a base portion comprising a strand of pliant but fixable material interwoven as a series of substantially concentric tiers of interlocking loops, and associated supporting means for supporting an implement or decorative article. In one embodiment of the invention, the supporting means comprises an extension of the strand of base material adapted to support and retain the implement; in an alternate embodiment of the invention, the supporting means comprises an attachment to the base. Preferably, the holder further includes an artificial flower, the stem of which forms both an element of the base portion and the supporting means, thereby serving as a functional and decorative element of the holder of the invention.

DETAILED DESCRIPTION OF THE INVENTION

Figure 1:
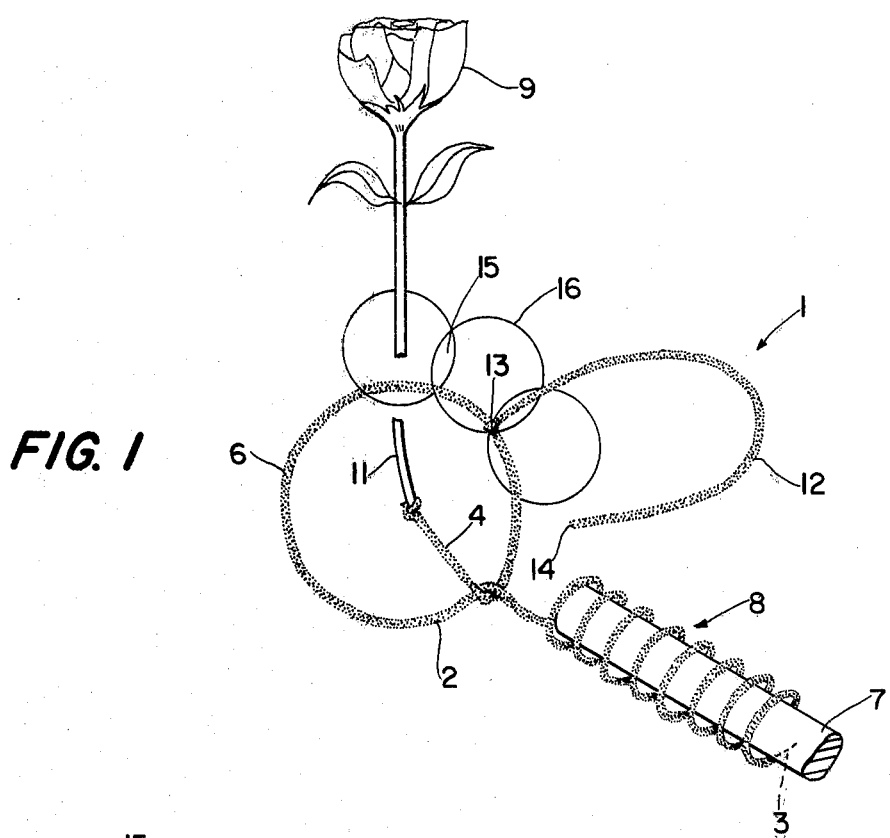
FIG. 1 is a cut-away of the decorative holder of the invention wherein the supporting means comprise an extension of the strand from which the base portion is interwoven.

With particular reference to FIG. 1, the decorative holder of the invention generally indicated at 1, is illustrated at the beginning of construction thereof. A first strand 2 of a pliant yet fixable material having a first end portion 3 and a second end portion 4 is formed into a substantially closed frame element 6 by crossing the end portions 3 and 4 of the strand 2. The first end portion 3 is formed into supporting means for an implement 7 comprising a substantially helical coil 8 by bending the strand repetitively around the implement to be held; the second end portion 4 is trailed and secured to an artificial flower 9, for example, by twisting the strand about the stem portion 11 of the flower 9, or by other standard means such as insertion, glue, or wire.

Figure 2:
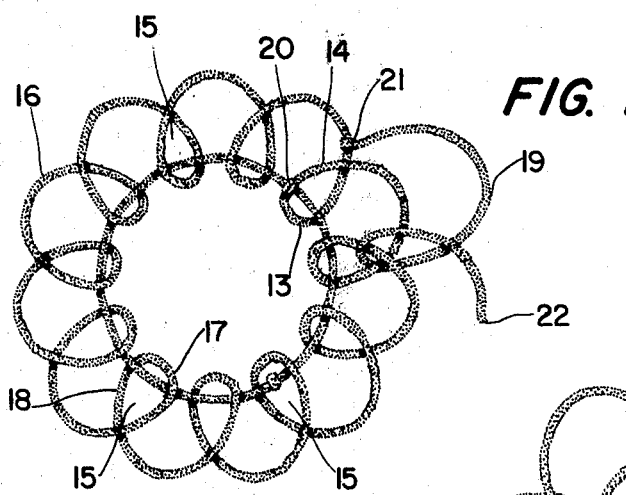
FIGS. 2 and 3 illustrate the method of forming the holder of FIG. 1.

A second strand 12 having a starting end 13 and a loose end 14, preferably of the same material as the strand 2, is then attached at the starting end 13 to the closed frame element 6 at any point thereupon, and a first tier 16 of overlapping loops 15 from the continuous strand 12 is formed; the formed tier of loops 16 is best seen in FIG. 2. Each of the loops 15 is formed by moving the loose end 14 of strand 12 in a clockwise or counterclockwise fashion about the frame element 6 so that each of the loops 15 is axially intersected by the frame element 6 to form a crossover portion 17 and a crossunder portion 18 of the loops 15. After a sufficient number of the loops 15 have been evenly disposed about the frame element 6, the loose end 14 of the strand 12 is secured at a point 20 on the frame element 6, for example, near the attachment point of the starting end 13 of the strand 12; excess is then cut off.

Figure 3:
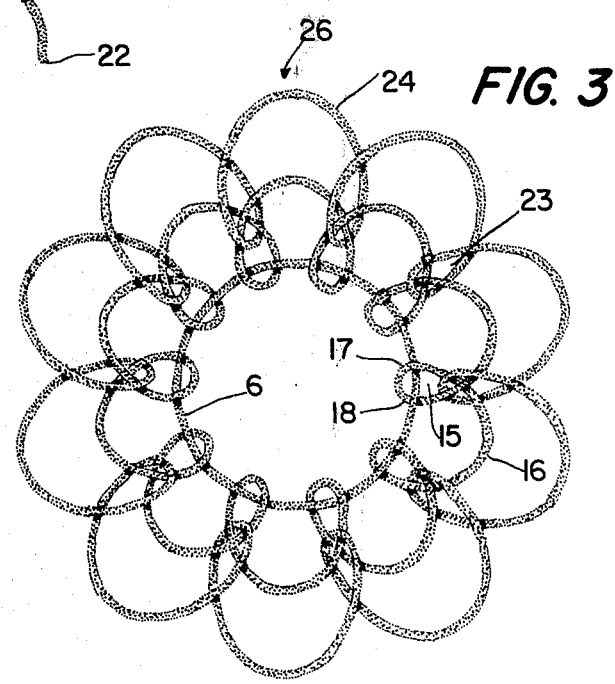

A third strand 19, having a starting end 21 and a loose end 22, preferably of the same material as the strand 2, is then attached by the starting end 21 thereof to one of the loops 15 at the point where the cross-over and crossunder portions 17 and 18 thereof intersect, and a second tier 24 of overlapping loops 23 is formed; the completed tier 24 is best seen in FIG. 3. Each of the loops 24 is formed by weaving the loose end 22 of the strand 19 between the cross-over and cross-under portions 17 and 18 of the loops 15 to overcast the first tier of loops 16 until the second tier 24 of overlapping loops 23 is complete. The loose end 22 of the strand 19 is then secured at the next nearest intersection of a cross-over and cross-under portion 17 and 18 of a loop 15; excess is then cut off. Further tiers are added in a similar fashion to complete the base portion generally indicated at 26 of the FIG. 3. For an average size implement, such as a pen or pencil, one to four tiers of average-sized pliant strands will generally be suitable; sufficient tiers should be provided so that the base portion 26 is large enough to counterbalance the weight of the supported implement 7 and decorative flower 9.

The pliant material of the strands 2, 12, and 19 is preferably a stiff, yet flexible material such as a wire strand which is covered with a decorative material for aesthetic reasons. Suitable materials include pipe cleaners, plastic coated wire, or painted or enameled wire. Further, the decorative holder 1 may be formed from a continuous strand 2, rather than separate strands 2, 12, and 19.

In order to finish the base 26, the loops 15 and 23 are flattened and the points of intersection of the strands 2, 12 and 19 secured, by standard means such as by pinching, bending or twisting, so that the base 26 will retain its shape; alternatively, and preferably, the loops are flattened and secured as made. While it is generally preferable to have a substantially flat base 26, a slightly concave or convex base can be made by reducing the circumference of the succeeding tiers. Also, while the frame element 6 is illustrated as circular, other endless structural shapes, such as ellipses, rectangles, ovals, squares, and the like may be employed.

After the strands 2, 12 and 19 have been secured, the cross-over and cross-under portions 17 and 18 of the loops of each succeeding tier are in substantial alignment, radiating out like a sunburst, and presenting a neat appearance while making it difficult to discern the actual points of intersection of the strands 2, 12 and 19.

Figure 4:
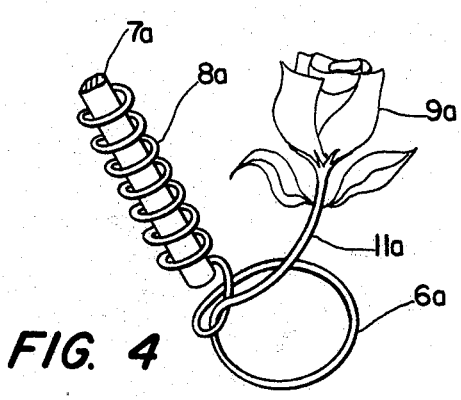
FIG. 4 is a perspective view of a portion of an alternate embodiment of the decorative holder of FIG. 1.

In an alternate embodiment the closed frame element 6 and helical coil 8 are fashioned in a similar manner but from an extended stem portion 11 of the flower 9, rather than from the separate strand 2. In this embodiment, shown in FIG. 4, the pliant yet flexible stem 11a of a decorative flower 9a is employed as the first strand forming the closed frame element 6a in lieu of the first strand 2 of FIG. 1; in the embodiment of FIG. 4, the stem 11a is further formed into helical coil 8a, comprising the supporting means of the decorative holder 1 for the implement 7a. A compact, neat, and durable unitary structure comprising a decorative holder is accordingly provided.

I claim:

1. A decorative holder for an implement or similar article comprising supporting means for supporting said implement and a base portion including a closed frame element comprising a single strand having disposed thereupon a first tier of loops formed from a continuous single strand of pliant and fixable material, each of said loops having a cross-over portion crossing over and touching said frame element and a cross-under portion crossing under and touching said frame element so that the frame element axially intersects each of the loops, said supporting means comprising an extension of said closed frame element formed into a substantially helical coil.

2. The invention of claim 1, further including an associated decorative flower, wherein the frame element and supporting means are formed from the stem of the flower.

3. The invention of claim 1, further including a second tier of loops disposed on the first tier of loops comprising a continuous strand of pliant and fixable material passed in sequence between the cross-over and cross-under portions of the adjacent loops so that the first tier of loops is overcast by the second tier.

4. The invention of claim 1, wherein the pliant material is pipe cleaner.

5. The invention of claim 1, wherein the implement is a pen, pencil or thermometer.

6. A method of making a decorative holder including a base portion comprising a closed frame element comprising a single strand; a strand, or strands, of a pliant and fixable material interwoven as at least one tier of interlocking loops; and supporting means associated with the base portion for supporting an implement or decorative article, said method comprising
  (a) forming a closed frame element from a first continuous single strand of pliant material by interconnecting portions of said strand to provide a first end portion and a trailing second end portion;
  (b) attaching a starting end portion of a second continuous strand to the frame element and looping the second strand around the frame element so that each of the loops is axially intersected by the frame element to form a first tier of loops wherein each loop includes a cross-over portion crossing over and touching the frame element and a cross-under portion crossing under and touching the frame element; and
  (c) forming the first end portion of the circular frame element into a substantially helical coil for supporting the element.

7. The invention of claim 6, further including attaching a starting end portion of a third continuous strand to the first tier of loops and looping the third strand in sequence between the cross-over and cross-under portions of adjacent loops of the first tier to form a second tier of loops over the first tier.

8. The invention of claim 6 wherein the strand of pliant material includes a wire, or a wire coated with plastic.

9. The invention of claim 6 wherein the trailing second end portion of the circular frame element is attached to an artificial flower.

* * * * *